(12) United States Patent
Jannot et al.

(10) Patent No.: US 8,372,331 B2
(45) Date of Patent: Feb. 12, 2013

(54) PROCESS FOR MANUFACTURING A PLASTIC FUEL TANK

(75) Inventors: Frédéric Jannot, Bousval (BE); Bjorn Criel, Sint-Martens-Lennik (BE); Pierre-François Tardy, Brussels (BE); Pierric Besnard, Laval (FR); Stéphane Galliot, Margny les Compiegne (FR)

(73) Assignee: Inergy Automotive Systems Research (S.A.), Brussels (BE)

( * ) Notice: Subject to any disclaimer, the term of this patent is extended or adjusted under 35 U.S.C. 154(b) by 0 days.

(21) Appl. No.: 12/680,329

(22) PCT Filed: Sep. 1, 2008

(86) PCT No.: PCT/EP2008/061510
§ 371 (c)(1),
(2), (4) Date: Nov. 23, 2010

(87) PCT Pub. No.: WO2009/043660
PCT Pub. Date: Apr. 9, 2009

(65) Prior Publication Data
US 2011/0068515 A1    Mar. 24, 2011

(30) Foreign Application Priority Data
Oct. 2, 2007    (FR) ...................................... 07 57991

(51) Int. Cl.
*B29C 45/14*    (2006.01)
(52) U.S. Cl. .................................................... 264/516
(58) Field of Classification Search .................. 264/516
See application file for complete search history.

(56) References Cited

U.S. PATENT DOCUMENTS

| 2001/0015513 A1 | 8/2001 | Schaftingen et al. |
| 2002/0011271 A1 | 1/2002 | Taurel et al. |

(Continued)

FOREIGN PATENT DOCUMENTS

| CA | 2641463 A1 | 8/2007 |
| DE | 10010900 A1 | 9/2001 |

(Continued)

OTHER PUBLICATIONS

U.S. Appl. No. 11/993,424, filed Feb. 24, 2010, Bjorn Criel et al.

*Primary Examiner* — Larry Thrower
(74) *Attorney, Agent, or Firm* — Oblon, Spivak, McClelland, Maier & Neustadt, L.L.P.

(57) ABSTRACT

Process for manufacturing a plastic fuel tank equipped with an internal line by molding a parison using a mold comprising two cavities and a core, comprising the following steps: introducing the parison into the mold cavities; introducing the core inside the parison, said core having first been fitted with the line; closing the mold so that the cavities come into leaktight contact with the core; pressing the parison against the cavities by blowing through the core and/or applying a vacuum behind the cavities; fastening the line to the parison over at least two points using a device attached to the core; opening the mold to withdraw the core; and carrying out the final molding of the parison by blow molding and/or thermoforming, in which the line comprises, between its fastening points, a free length that is capable of coming into contact with the parison and/or with an accessory found thereon when the mold is closed, and wherein during the fastening step, at least one intermediate fastening point is created using a device attached to the core.

12 Claims, 3 Drawing Sheets

U.S. PATENT DOCUMENTS

| | | |
|---|---|---|
| 2005/0205156 A1 | 9/2005 | Ganachaud et al. |
| 2008/0164639 A1 | 7/2008 | Criel et al. |
| 2008/0217188 A1 | 9/2008 | Borchert et al. |
| 2008/0224363 A1 | 9/2008 | Criel et al. |
| 2009/0152263 A1 | 6/2009 | Criel et al. |

FOREIGN PATENT DOCUMENTS

| | | |
|---|---|---|
| DE | 102006006469 A1 | 8/2007 |
| EP | 1110697 A2 | 6/2001 |
| EP | 1151887 A1 | 11/2001 |
| FR | 2873321 A1 | 1/2006 |
| FR | 2877256 A1 | 5/2006 |
| GB | 1410215 A | 10/1975 |
| WO | WO 2004024487 A1 | 3/2004 |
| WO | WO 2006008308 A1 | 1/2006 |
| WO | WO 2006095024 A1 | 9/2006 |
| WO | WO 2007000454 A1 | 1/2007 |
| WO | WO 2007093573 A1 | 8/2007 |
| WO | WO 2008061588 A1 | 5/2008 |

# PROCESS FOR MANUFACTURING A PLASTIC FUEL TANK

CROSS-REFERENCE TO RELATED APPLICATIONS

This application is a U.S. national stage application under 35 U.S.C.§371 of International Application No. PCT/EP2008/062510 filed Sep. 1, 2008, which claims priority to French Patent Application No. 07.57991 filed Oct. 2, 2007, these applications being incorporated herein by reference in their entirety for all purposes.

TECHNICAL FIELD OF THE INVENTION

The present invention relates to a process for manufacturing a plastic fuel tank (FT).

BACKGROUND OF THE INVENTION

Fuel tanks on board vehicles of various kinds generally have to meet leaktightness and permeability standards in relation to the type of use for which they are designed and the environmental requirements that they have to satisfy. At the present time, both in Europe and throughout the world, there is a substantial tightening of the requirements regarding the limitation of pollutant emissions into the atmosphere and into the environment in general.

To limit these emissions, care is taken in particular to position the components (ventilation lines, valves, baffles, stiffeners, etc.) inside the tank and/or the fill pipe (see in particular application WO 2004/024487 in the name of the Applicant). However, when these components are fastened to the tank after it has been molded, it is generally necessary to make at least one opening in the tank so as to be able to introduce said components into the tank and to fasten them thereto. Hence there may be potential leakage problems near this opening.

Several years ago the Applicant therefore developed a process of initially molding a cut parison (cut into two sections) in order to be able to introduce thereinto and fasten thereto components during the actual molding of the tank and to thus avoid drilling openings (see Patent EP 1 110 697 in the name of the Applicant).

This process has since been the subject of several improvements targeting particular means for fastening these components: see in particular Applications WO 2006/008308 (fastening of components by rivet punching), WO 2006/095024 (fastening of ventilation lines that have a part that can be deformed due to the presence of a bend that is stretched during the attachment of these lines to the parison) and WO 2007/000454 (fastening of components according to an ideal layout and in particular, as regards the ventilation lines, while avoiding the formation of siphons).

These improvements have been able to be made due to the use of a core i.e. a part of suitable size and shape for being able to be inserted between the cavities of the mold when the parison is located therein and to fasten thereto the components inside the tank without the edges of the parison being welded (since the core must be removed before the final molding of the tank, a step during which the welding of the parison sections is carried out). Such a part (core) is, for example, described in Patent GB 1 410 215, the content of which is for this purpose incorporated by reference into the present application.

However, during the implementation of these various improvements, the Applicant noticed that in certain cases the components were not in the molded and cooled tank, at the location at which the core had placed them on the parison. The Applicant has also observed in certain cases (for example, in the case of saddle tanks, in the restriction leading from one pocket to the other), a local degradation of the internal surface of the wall of the tank which, although not visible from the outside, may lead to a degradation of the FT performances as regards the impermeability.

After analyses of the various cases observed, the Applicant has finally found the source of the problem: in general, the lines (ventilation lines, fuel or electricity supply lines, etc.) are only fastened to the FT by their ends and/or by their active points (for example; by the ventilation valves in the case of ventilation lines) and they can therefore, when the mold is being closed for the definitive molding of the tank (after having removed therefrom the core which has fastened the components to the parison), come to press on the part of the parison opposite and/or close to them.

It should specifically be noted that in order to be able to compensate for the thermal expansions of the tank when in service, these lines are generally fastened loosely and may therefore make loops or have free lengths between their fastening points. In conventional FT manufacturing processes, where the lines are fastened to the molded and cooled tank, the presence of such loops is common and is not an obstruction. Conversely, in a process such as that described above where the lines are fastened when the parison is molten, these loops are in fact the cause of the aforementioned problem since they can rub against the parison (and weaken it) and/or against another accessory found therein (and move the latter relative to its ideal location).

SUMMARY OF THE INVENTION

The objective of the invention is therefore to provide a process that makes it possible to integrate a line into a plastic fuel tank when it is being manufactured by molding without damaging the internal wall or altering the position of the other internal components.

For this purpose, the invention relates to a process for manufacturing a plastic fuel tank equipped with an internal line by molding a parison using a mold comprising two cavities and a core, said process comprising the following steps:
1. the parison is introduced into the mold cavities;
2. the core is introduced inside the parison, said core having first been fitted with the line;
3. the mold is closed so that the cavities come into leaktight contact with the core;
4. the parison is pressed against the cavities by blowing through the core and/or applying a vacuum behind the cavities;
5. the line is fastened to the parison over at least two points using a device attached to the core;
6. the mold is opened to withdraw the core; and
7. the final molding of the parison is carried out by blow molding (by injecting a pressurized fluid inside the parison) and/or thermoforming (by applying a vacuum behind the cavities), in which the line comprises, between its fastening points, a free length that is capable of coming into contact with the parison and/or with an accessory found thereon when the mold is closed, and according to which, during step (5), at least one intermediate fastening point is created using a device attached to the core.

It should be noted that in this process, steps 1 and 2 may take place simultaneously.

BRIEF DESCRIPTION OF THE DRAWINGS

For a detailed description of the preferred embodiments of the invention, reference will now be made to the accompanying drawings in which.

Figure 5:
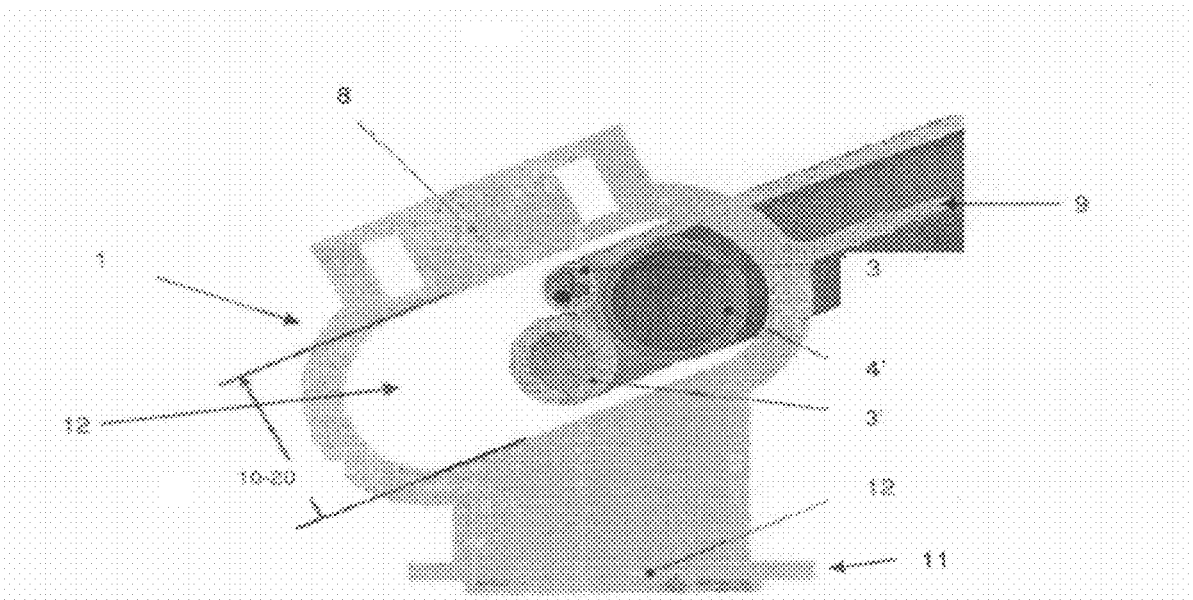
Figure 6:
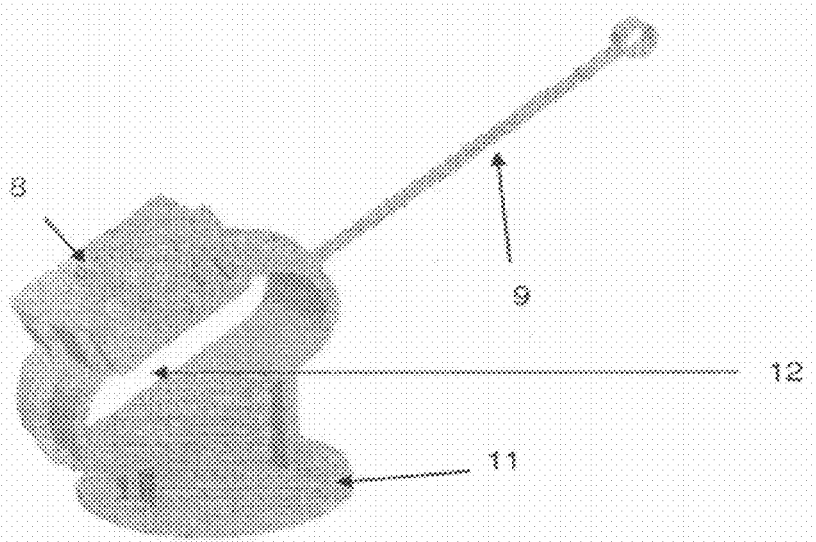

a clip that incorporates another variant of the present invention;

FIG. 5 illustrates another enlarged view of a clip (1) made from HDPE and provided with a single wide opening (12) inserted into which are an electrical line (3), a fuel supply line (4) and a fuel return line (4'); and FIG. 6 illustrates yet another enlarged view of a clip (1) made from HDPE and provided with a single wide opening (12) but without showing lines inserted therein.

DETAILED DESCRIPTION OF THE PREFERRED EMBODIMENTS

The expression "fuel tank" is understood to mean an impermeable tank, able to store fuel under diverse and varied usage and environmental conditions. An example of this tank is that with which motor vehicles are fitted.

The fuel tank according to the invention is made of plastic.

The term "plastic" means any material comprising at least one synthetic resin polymer.

Any type of plastic may be suitable. Particularly suitable plastics belong to the category of thermoplastics.

The term "thermoplastic" is understood to mean any thermoplastic polymer, including thermoplastic elastomers, and also blends thereof. The term "polymer" is understood to mean both homopolymers and copolymers (especially binary or ternary copolymers). Examples of such copolymers are, in a non-limiting manner: random copolymers, linear block copolymers, other block copolymers and graft copolymers.

Any type of thermoplastic polymer or copolymer, the melting point of which is below the decomposition temperature, is suitable. Synthetic thermoplastics having a melting range spread over at least 10 degrees Celsius are particularly suitable. Examples of such materials include those that exhibit polydispersion in their molecular weight.

In particular, it is possible to use polyolefins, thermoplastic polyesters, polyketones, polyamides and copolymers thereof. A blend of polymers or copolymers may also be used; similarly it is also possible to use a blend of polymeric materials with inorganic, organic and/or natural fillers such as, for example but in a non-limiting manner: carbon, salts and other inorganic derivatives, natural or polymeric fibres. It is also possible to use multilayer structures composed of stacked and joined layers comprising at least one of the polymers or copolymers described above.

One polymer that is often used is polyethylene. Excellent results have been obtained with high-density polyethylene (HDPE).

The wall of the tank may be composed of a single thermoplastic layer, or of two layers. One or more other possible additional layers may, advantageously, be composed of layers made of a barrier material to liquids and/or gases. Preferably, the nature and thickness of the barrier layer are chosen so as to minimize the permeability of liquids and gases in contact with the internal surface of the tank. Preferably, this layer is based on a barrier resin, that is to say a resin that is impermeable to the fuel such as, for example, EVOH (a partially hydrolysed ethylene/vinyl acetate copolymer). Alternatively, the tank may be subjected to a surface treatment (fluorination or sulfonation) for the purpose of making it impermeable to the fuel.

The tank according to the invention preferably comprises an EVOH-based barrier layer located between the HDPE-based outer layers.

According to the invention, the tank is produced by molding a parison. The term "parison" is understood to mean a preform, which is generally extruded and is intended to form the wall of the tank after molding to the required shapes and dimensions. This preform does not necessarily have to be a one-piece preform.

Thus, advantageously, the parison is in fact made up of two separate pieces, which may be two sheets, for example. However, these pieces preferably result from cutting one and the same extruded tubular parison as described in the aforementioned Application EP 1 110 697, the content of which for this purpose is incorporated by reference in the present application. According to this variant, once a single parison has been extruded, this parison is cut over its entire length, along two diametrically opposed lines, to obtain two separate parts (sheets).

By comparison with the molding of two separately extruded sheets, the thickness of which is constant, this approach makes it possible to use parisons of varying thickness (that is to say in which the thickness is not constant over their length), obtained using a suitable extrusion device (generally an extruder equipped with a die and a punch, the position of which is adjustable). Such a parison takes account of the reduction in thickness that occurs during molding at certain points on the parison, as a result of non-constant rates of deformation of the material in the mould.

After a parison has been molded in two pieces, these pieces generally form the lower and upper walls respectively of the fuel tank, each having an inner surface (pointing towards the inside of the tank) and an outer surface (pointing towards the outside of the tank).

The mold used in the process according to the invention comprises a core as defined previously and two cavities that are intended to be in contact with the outer surface of the parison, the parison being molded by blow molding (pressing the parison against these cavities using a pressurized gas injected into the parison) and/or thermoforming (drawing a vacuum behind the mold cavities).

Preferably, it takes place by blow moulding, but preferably while also providing suction (drawing a vacuum) behind the cavities to keep the parison in the mold when the latter is not closed and pressurized. Hence, it preferably comprises a degassing step prior to step (6). Generally, in order to do this the parison is first pierced (for example by puncturing it with a needle) and then the fluid is discharged from the mold (for example using a valve).

In the process according to the invention, the line is fastened to the inner surface of the parison by virtue of a device attached to the core that generally comprises a jack. Preferably, the core allows several accessories to be fastened to the inside of the tank, these accessories preferably being preassembled on the core, before it is inserted into the mould, at their corresponding location on the parison (see the aforementioned Application WO 2007/000454).

According to one particularly advantageous variant of the invention, the line and at least one other component inside the tank are first mounted on a common support (frame) that is used for loading the core. Thus, even before loading into the core, the components may be positioned and assembled on this frame which allows excellent repeatability in the X, Y, Z positioning of the components and facilitates the handling of assemblies that are sometimes complex and therefore not very ergonomic (a ventilation system, for example). The frame may be handled by an operator or by a robot, depending on the weight of the parts in question. As regards the loading of the core, it is in fact carried out by fastening the frame directly to the core, with the components arranged opposite devices that will fasten them to the parison and that are attached to the core (clamps actuated by jacks, for example). This approach makes it possible to make savings in terms of the cycle time since the assembly of the various components to the support can be carried out independently of the molding process.

It should be noted that the use of a frame for loading the core is also advantageous outside the context of the invention for any process for molding an FT with fastening of internal components by means of the core.

The core used in the process according to the invention may also be used for blowing the pressurized gas required for blow molding of the parison and, when the parison to be blow-moulded is in 2 sections, the core may also be used to keep the edges of these two sections hot, during steps (3) to (5) at least of the process.

Finally, the core may also be used at least partially for process control. For this purpose, it is possible for example to incorporate a camera into the core so as to display and check the quality of the fastening of the pipe (and of other possible components of the tank) by image analysis. One or more sensor(s) for measuring a quantity or quantities such as force, travel, pressure and temperature may also be fitted onto the core so as to better control the fastening of the pipe to the parison.

The present invention is particularly suitable for fastening an internal line to two points of a same parison part and in particular to the inner surface of the upper (wall) part of the tank (whether or not the latter is molded from a parison in two separate pieces). These points are generally separated by a few cm, or even by more than ten centimetres.

The term "line" is understood within the context of the invention to mean a pipe, i.e. a duct of elongated shape, preferably open at its ends and of substantially tubular cross section. The line according to the invention may be a ventilation line, a line for pumping fuel, for returning fuel from the engine to the tank (in the case of diesel engines), or for filling; an electric line (in this case, the pipe is generally the sheathing of an electrical cable), etc. This line is preferably used to transport something (a fluid, electricity, etc.). According to the invention, it is fastened to the tank (or more precisely: to the parison, the word "tank" denoting the finished, molded article) at least two points, generally via its ends and/or active points.

The term "fastened" is understood to mean that the line is either directly in contact with the wall of the tank, or attached to an intermediate fastening means that is, itself, directly in contact with the tank wall. The term "contact" is understood to mean either a mechanical fastening (that can be dismantled) or a weld (or molecular interpenetration). The latter gives good results from the point of view of permeability and is practical to use within the context of the invention, as the parison is melted/softened during moulding. Therefore, other techniques (preferably also taking advantage of the fact that the parison is melted/softened) can also be used such as, for example, rivet punching. This is a technique described in Application FR 04/08196 in the name of the Applicant, and the content of which is incorporated by reference in the present application.

Preferably, the line is attached by an intermediate fastening means and most particularly preferably the latter has a geometry such that the line can slide into it easily (i.e. with little friction) and therefore have a relative mobility so as to ensure that it can move without constraint especially in the major axis of the shrinkage of the tank which occurs after molding (during cooling of said tank). For this purpose, a clip (i.e. a ring or part (slice) of a cylinder having a length less than its diameter) gives good results and in particular a clip having a diameter such that the line, when it is inserted therein and hangs by gravity, is only in contact with one part of its inner surface. One way of achieving this in practice consists in ensuring that the line (or lines, where appropriate) occupies at most ¾ of the internal volume of the clip, preferably at most ⅔ and most particularly preferably at most half of the available internal volume.

The expression "active points" is understood to mean a part or an accessory of the line fulfilling an active role in the tank, i.e. for example: a ventilation valve; a connection (coupling) to an accessory outside the tank (for example, an electrical connection with a voltage source; a hydraulic connection to an engine, etc.). According to one particularly advantageous variant of the invention, at least one fastening point of the line is formed from an accessory that makes it possible, due to the fact that it is fastened to the parison and due to the manner in which it is attached to the line, to prevent this line from rotating. This is because said line may, in certain cases, comprise "free" accessories (that are attached to the line but are not fastened in the tank), of which the rotation (driven by that of the line) could also damage the parison. One way of achieving this in practice consists in providing the line and the accessory with complementary reliefs that fit together by a quick coupling and which prevent the relative rotation of these components. A "fir-tree" fitting with rotational stop is particularly suitable for this purpose.

It should be noted that use of an anti-rotation fastening is also advantageous outside the scope of the invention, when it is a question of fastening a line inside an FT.

The line according to the invention may be made from any material suitable for its function. In the case of a pipe that transports a fluid at a temperature close to ambient (such as a ventilation pipe for the tank (the purpose of which is generally to connect the top of the tank to a device for adsorbing fuel vapours or a canister), a vapour-venting line (that sends some of the vapours to the top of the fill pipe when the tank is being filled), a line for fixing the maximum fuel level (the obstruction of which by the level of fuel causes the nozzle to trip), etc.), this pipe is generally based on a plastic, and in particular on HDPE.

Preferably, as described in the aforementioned Application WO 2006/095024, the line can be deformed between the points for fastening it to the tank due to the presence of at least one bend. The expression "can be deformed" is understood to mean that the distance between the two fastening points of the pipe is variable. The term "bend" is understood in fact to denote any deformation that allows the pipe to be lengthened when stretched (such as a coil (convolution), or one or more corrugations (bellows, crimping) for example). One variant which is very suitable in practice (because it is easy to apply by a simple (preferably hot) deformation of the pipe) consists in making at least one bend shaped like an "S", a wave or a "V" (or more strictly a "W" if the ends of the bend are counted) in the required region. Thus, in a way, a spring is made in the pipe, which is stretched when the pipe is mounted onto the parison in a manner (or to an extent) such that it is preferably at rest (or almost at rest) when the molded tank is cooled.

Preferably, the line of the process according to the invention is a ventilation pipe that comprises at least one valve. Preferably, it is characterized by the presence of a valve at least one of its ends and particularly advantageously, it comprises a valve at each of its ends, and it is via these valves that the pipe is fastened to the tank, and also by an intermediate fastening point that has no other role than to eliminate the loop (free length).

This is because in tanks comprising several (at least two) pockets (saddle tanks), it is generally advisable to ventilate at least one (some) of them. One means for achieving this that is suitable in practice consists in equipping the pocket or pockets that it is desired to ventilate with a ventilation valve and to connect this valve to a canister via a pipe as described previously and also by a valve attached between the pipe and the canister. Such a valve may fulfil several functions: prevent liquid fuel from entering into the canister in the case of a wave or if the vehicle rolls over (ROV or Roll Over Valve function); prevent overfilling (ISR function); trap drops of liquid fuel that may be entrained by the vapour (liquid-vapour separation function), etc. The present invention is particularly suitable in the context of fastening ventilation pipes that join together various valves on a fuel tank.

In the case of a saddle tank as described previously, a critical location already mentioned above is constituted by the central part of the tank that joins the pockets together and that generally has a reduced height. The present invention especially makes it possible to avoid damaging the wall of the tank at this location, where the ventilation line or lines must pass even though the dimensions are reduced, by providing an additional fastening point in or close to this region.

More generally, the invention makes it possible to overcome the damaging of the parison and/or displacement of its internal accessories due to the presence of loops (free lengths) in the internal lines by eliminating said loops via making an intermediate fastening point between the ends of these loops, this point generally having no other function than that of removing the loops.

When the line is based on the same material as the inner surface of the FT (generally HDPE), this intermediate fastening may be created by welding simply by pushing the free loop against said surface using a device attached to the core (which generally comprises a jack for this purpose, for example a hydraulic jack). However, in particular when it is a question of a ventilation line, said line may collapse (flatten) considering the high temperature of the parison.

Therefore, as already mentioned above, according to one advantageous variant of the invention, the intermediate fastening point is created using a fastening part which received the line prior to its fastening inside the tank and which will be effectively welded to the parison at the intermediate fastening point by pressure using a device attached to the core. Preferably, this is a part made from HDPE so that it can be welded to the FT by pressing against its wall. A simple HDPE clip, which receives the line at the required location, is particularly suitable for this purpose.

According to another advantageous variant, the line is at least in the region of the intermediate fastening point, partially based on a material that has a greater thermal resistance than that of the tank (for example: based on PA (polyamide) or on POM (polyoxymethylene) when the tank is made from HDPE) and the mold cavities comprise, at the location of said fastening point, a suitable relief in order to ensure that under the pressure of a device attached to the core the line lodges itself in said relief at this location, one section of the parison then being clamped between said relief and the line. This relief must then have a geometry such that, when the tank is demoulded, the pipe is fastened by said clamped section. The relief in the cavities is generally in the shape of a groove. Advantageously, this groove is surrounded by at least two oblique jacks that locally push the parison from the outside (i.e. from the cavities towards the core) so that it marries up with the line at the intermediate fastening location.

In this variant, either the entire line may be based on a material having an improved thermal resistance such as PA or POM or, preferably, the line is made from HDPE but is equipped with a sheath based on such a material at the location of its intermediate fastening point.

Figure 1:
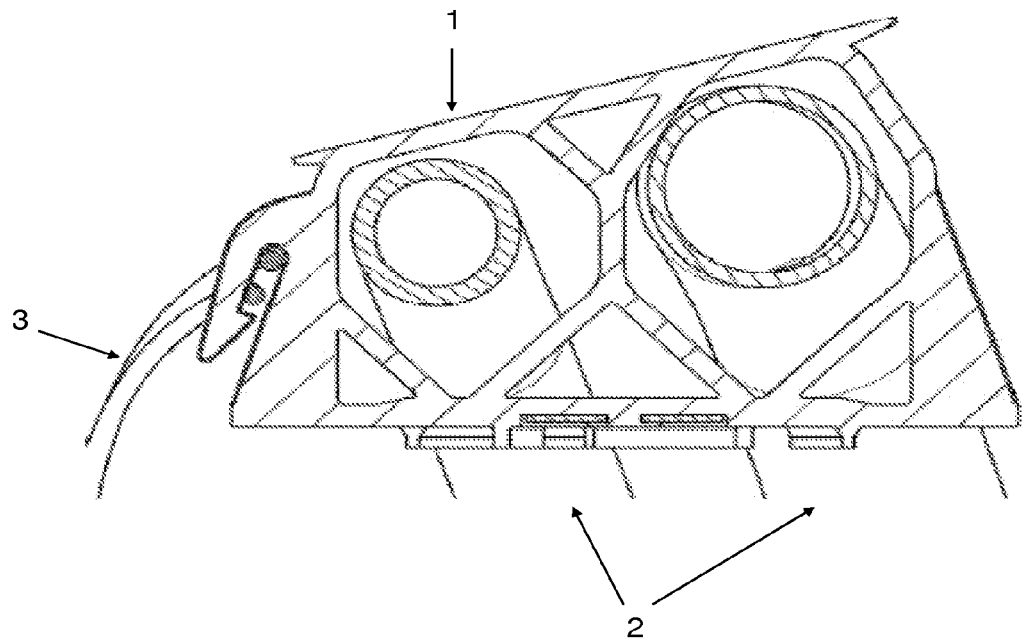
FIG. 1 illustrates a cross section through a high-density polyethylene (HDPE) clip (1), inserted into which are ventilation lines (2) and electrical lines (3) and which is intended to fasten these lines to a molten HDPE parison.
Figure 2:
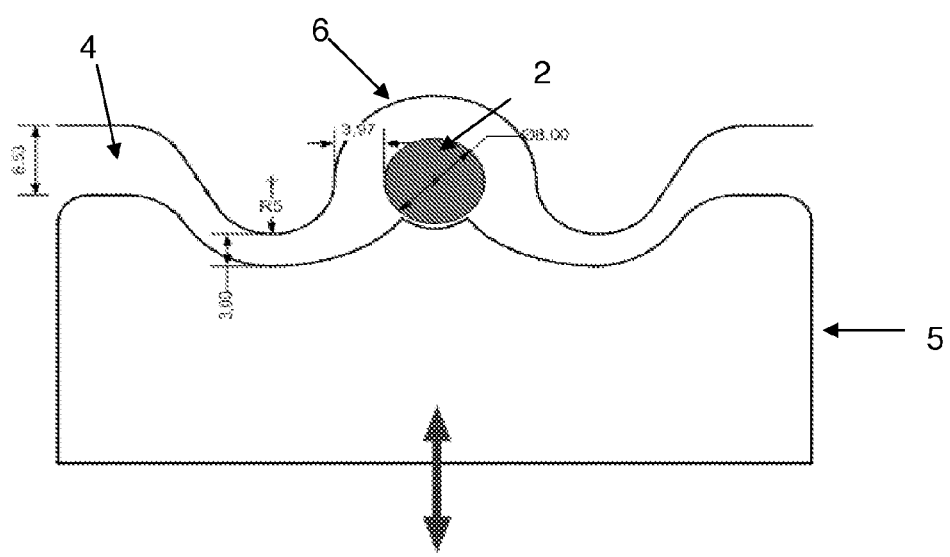
FIG. 2 illustrates the fastening of a ventilation line (2) to a parison (4) using a moveable device (5) actuated by a jack (not illustrated) using a relief in the mold cavities.
Figure 3:
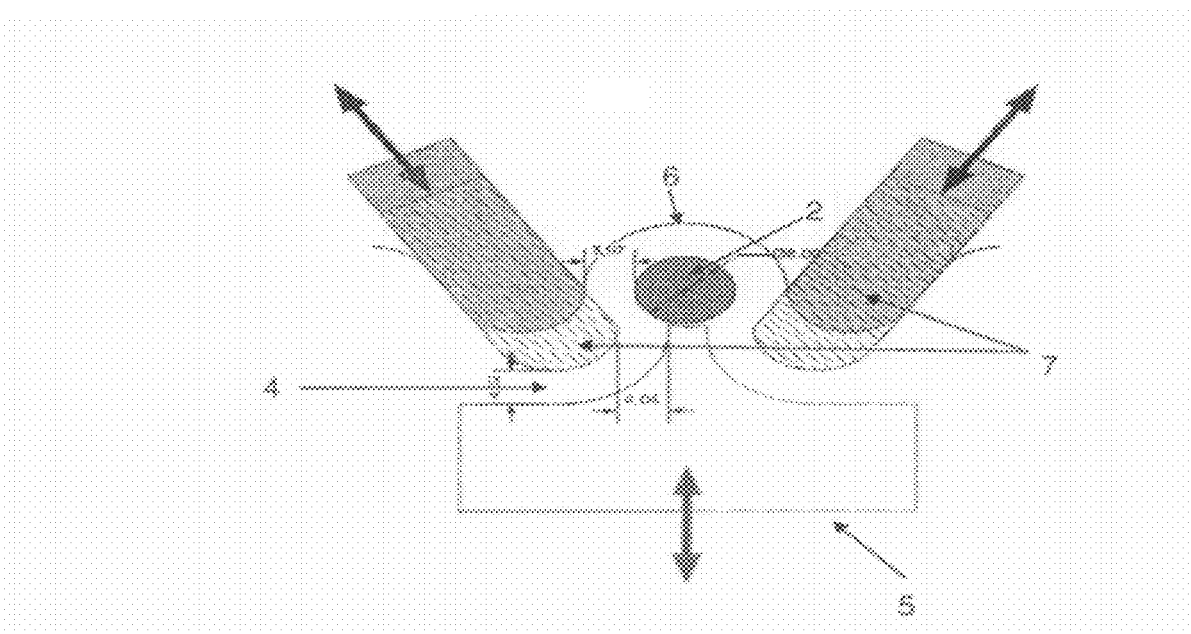
FIG. 3 illustrates a similar fastening method as in FIG. 2 but where the mold cavities are equipped with two oblique jacks (7)
Figure 4:
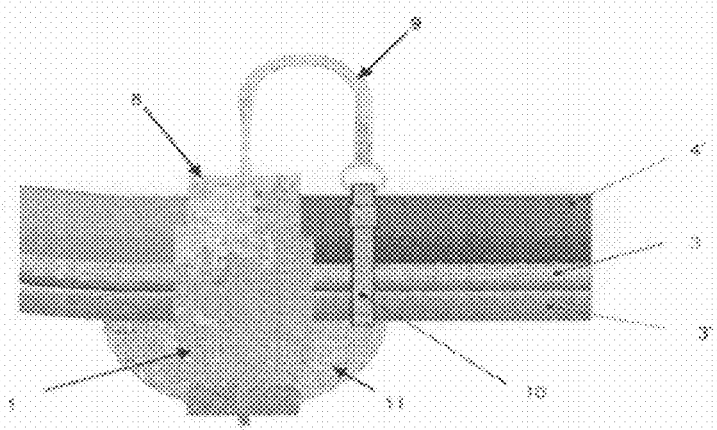
FIG. 4 illustrates an enlarged view of a clip (1) made from HDPE, provided with a single wide opening (12) inserted into which are an electrical line (3), a fuel supply line (4) and a fuel return line (4')

Two preferred variants of the invention (respectively with clips or with a relief in the mold cavities) are respectively illustrated schematically by FIGS. 1 and 2-3. A clip that incorporates several other preferred variants of the invention is illustrated in FIGS. 4 to 6.

In these figures identical numbers denote identical or similar components.

FIG. 1 shows a cross section through an HDPE clip (1), inserted into which are ventilation lines (2) and electrical lines (3) and which is intended to fasten these lines to a molten HDPE parison. This clip is loosely fastened to (receives) a "free" loop of these lines and it will be welded to the parison using a jack present on the core that will push the clip onto/into the parison in order to weld it thereto, all this, therefore, without deforming the lines. This clip is provided with two wide openings into which the lines are inserted very loosely so as to ensure that they can move without constraint especially during the shrinkage of the tank after molding. It also comprises welding platforms (weld feet) or excrescences on its surface that is intended to be welded to the wall of the tank (lower surface).

FIG. 2 shows the fastening of a ventilation line (2) to a parison (4) using a moveable device (5) actuated by a jack attached to the core (these are not illustrated) and which, by displacement (indicated by the arrow) and pressure on the line, makes it possible to lodge this line in a groove (6) present in the mold cavities (only one part of which, next to the groove, is represented). It can be seen therein how the parison (4) surrounds the line (2) when it is in the molten state. Once solidified, it will keep the line (2) in place in a relief corresponding to that of the groove (6).

FIG. 3 illustrates a similar fastening method but where this time the mold cavities are equipped with two oblique jacks (7) that contribute (through their displacement in the direction of the arrows) to correct covering of the line (2) by the parison (4) level with the groove (6).

In FIGS. 2 and 3, dimensions are given by way of example.

FIGS. 4 to 6 are enlarged views of a clip (1), also made from HDPE, provided with a single wide opening (12) that has an indicated height of 10 to 20 mm, inserted into which are (in FIGS. 4 and 5, as FIG. 6 illustrates the clip alone) an electrical line (3), a fuel supply line (3') and a fuel return line (4').

These lines are held by a clamping collar (10) inserted into an opening made in a tongue (9) molded as one part with the clip (1).

This collar makes it possible to keep the cables and lines against one another, in particular for easier handling during loading of the core. It is also possible to avoid the risk of jamming in the clip (which would negate its purpose) through a random arrangement of cables and lines in this same clip during blow moulding.

The clip illustrated in these figures comprises a base (11) that enables it to be welded to the wall of an HDPE tank, and also a casing (8) that may be used to house a part (for example, an electrical connector) during the molding process, which it is then possible to dislodge after demolding in order to fasten it where it should be fastened inside the tank.

This electrical connector may be used to connect the component having this connector to an electrical component mounted during the final (manual) assembling operations. Without this casing (8), the operator would have to look for the connector in the tank.

A metal ring (12) is integrated into the welding base (11) so as to be able to easily locate the clip from the outside when the tank is molded.

It is worth noting that the idea of providing a plastic part with a metal insert also gives this same advantage outside the scope of the present invention, namely: in the frame of a process for controlling the location of internal plastic accessories in a plastic FT. It is namely so that this metal insert (which may be of any shape, for instance a metal disk) makes it easier to locate the part using a metal detector, X-rays scanning etc. . . . Hence, in the case of a plastic vent valve (like a ROV or Roll Over Valve; an FLVV or Fill Limiting Vent Valve, . . . ), a metal disk can be inserted between the cover and the body of the valve (in the case of two parts valves), in a recess on top of the cover before mounting the valve inside the tank etc. . . .

The invention claimed is:

1. A process for manufacturing a plastic fuel tank equipped with an internal line by molding a parison using a mold including two cavities and a core, said process comprising the following steps:
   1. introducing the parison into the mold cavities;
   2. introducing the core inside the parison, said core having first been fitted with the line;
   3. closing the mold so that the cavities come into leaktight contact with the core;
   4. pressing the parison against the cavities by blowing through the core and/or applying a vacuum behind the cavities;
   5. fastening the line to the parison over at least two points using a device attached to the core;
   6. opening the mold to withdraw the core; and
   7. carrying out final molding of the parison by blow molding and/or thermoforming, wherein the line includes, between fastening points thereof, a free length that is capable of coming into contact with the parison and/or with an accessory found thereon when the mold is closed, wherein, during step (5), at least one intermediate fastening point is created using the device attached to the core, and wherein the line is attached by a clip having a diameter such that, when the line is inserted therein and hangs by gravity, the line is only in contact with one part of an inner surface of the clip.

2. The process according to claim 1, wherein the parison includes two separate pieces originating from a singular extruded tubular parison that is cut over an entire length thereof, along two diametrically opposed lines.

3. The process according to claim 1, wherein the line and at least one other component inside the tank are first mounted on a common support that is used for loading the core.

4. The process according to claim 1, wherein at least one fastening point of the line is formed from an accessory that prevents the line from rotating, and
   wherein the accessory is fastened to the parison and the accessory is attached to the line.

5. The process according to claim 1, wherein the line is a ventilation pipe that has a valve at each end thereof, and
   wherein the ventilation pipe is fastened to the tank via the valves and by an intermediate fastening point.

6. The process according to claim 5, wherein the tank is a saddle tank including a central part of reduced height that joins together at least two pockets that each include one of the valves, and
   wherein the intermediate fastening point is in or close to the central part.

7. The process according to claim 1, wherein the at least one intermediate fastening point is created using the intermediate fastening part that receives the line before said line is fastened inside the tank, said intermediate fastening part being welded to the parison at the at least one intermediate fastening point by pressure using the device attached to the core.

8. The process according to claim 7, wherein the intermediate fastening part is a high-density polyethylene (HDPE) clip.

9. The process according to claim 7, wherein the line is at least in a vicinity of the at least one intermediate fastening point, partially based on a material that has a greater thermal resistance than a thermal resistance of the tank, and
   wherein the mold cavities comprise, at said at least one intermediate fastening point, a relief in order to ensure that under a pressure of the device attached to the core, the line is lodged in said relief, one section of the parison then being clamped between said relief and the line.

10. The process according to claim 9, wherein the relief in the cavities is a permanent groove-shaped relief or is a retractable relief including two oblique jacks that locally push the parison from an outside thereof so that said relief marries up with the line at the at least one intermediate fastening point.

11. The process according to claim 1, further comprising attaching a tongue of the intermediate fastening part to a collar surrounding the line.

12. The process according to claim 1, wherein the line occupies at most ¾ of an internal volume of the clip.

* * * * *